United States Patent [19]

Scott

[11] Patent Number: 4,542,761

[45] Date of Patent: Sep. 24, 1985

[54] FLUID DELIVERY SYSTEM

[75] Inventor: Richard D. Scott, Northridge, Calif.

[73] Assignee: HR Textron Inc., Valencia, Calif.

[21] Appl. No.: 512,830

[22] Filed: Jul. 11, 1983

[51] Int. Cl.[4] ............................................. F16K 13/06
[52] U.S. Cl. ................................................. 137/68 A
[58] Field of Search ........... 250/352; 137/68 A, 68 R, 137/67; 62/514 R

[56] References Cited

U.S. PATENT DOCUMENTS

| | | |
|---|---|---|
| 2,141,234 | 12/1938 | Wallace et al. |
| 2,557,448 | 6/1951 | Mathiesen . |
| 2,588,306 | 3/1952 | Taylor ............................. 137/68 R |
| 2,801,517 | 8/1957 | Zucrow et al. . |
| 2,937,654 | 5/1960 | Wilner . |
| 2,990,699 | 7/1961 | Dennis ............................ 62/514 R |
| 3,372,556 | 3/1968 | Waldman ........................ 62/514 R |
| 3,416,548 | 12/1968 | Bach et al. ...................... 137/68 A |
| 3,630,214 | 12/1971 | Levering . |
| 3,719,194 | 3/1973 | Anderson et al. . |
| 3,794,057 | 2/1974 | Badger . |
| 3,915,235 | 10/1975 | Hamilton et al. . |
| 4,126,184 | 11/1978 | Hinrichs . |

FOREIGN PATENT DOCUMENTS 7513949  5/1975  France .................. 62/514 R

Primary Examiner—Martin P. Schwadron
Assistant Examiner—John S. Starsiak, Jr.
Attorney, Agent, or Firm—Nilsson, Robbins, Dalgarn, Berliner, Carson & Wurst

[57] ABSTRACT

A valve useful for connecting a source of fluid under pressure to a using apparatus upon actuation of an explosive squib. The connecting structure includes an outer tube of soft material within which there is disposed an additional tube of brittle, frangible material having a reduced diameter area. The inner and outer tubes define an annular space surrounding an inner tubular space. One of the spaces is connected to the source of fluid under pressure, while the other of the spaces is connected to the using apparatus. Particularly, the inner tubular space is connected to a source of gas under pressure, while the outer annular area is connected to the using apparatus. Upon actuation of the squib the inner frangible tube is broken at the reduced diameter section upon a bending of the outer tube without its fracturing thereby connecting the source of fluid under pressure to the using apparatus, while at the same time isolating the products of combustion of the squib.

9 Claims, 6 Drawing Figures

FLUID DELIVERY SYSTEM

BACKGROUND OF THE INVENTION AND DESCRIPTION OF THE PRIOR ART

The present invention relates generally to fluid flow valves and particularly to apparatus for controlling the flow of fluids from a source thereof contained at very high pressures to a using apparatus.

In the operation of certain types of devices, for example, such as heat seeking missiles, it becomes necessary to maintain the infrared lens of such systems at cryogenic temperatures. The operation of these systems requires the application of fluids maintained at extremely high pressures to the cryostat in response to the occurrence of a prearranged sequence of events. Until the occurrence of these events it is necessary that the fluid container be absolutely leak tight and that upon the occurrence of the sequence of events, the fluid be propelled rapidly from the container thereof to the cryostat.

It is desirable that the valving mechanism in structures of the type above generally referred to be constructed as an integral part of the overall device to preclude any opportunity for leakage of the gas under pressure subsequent to final assembly and filling of the container It is also desirable that provisions be made for testing the cryostat and the infrared lens without utilization of the fluid under pressure held within the container.

Various prior art devices have been utilized which contain a source of pressurized fluid which, upon actuation of a squib or similar device, releases the pressure. Typically, such devices are useful in the field of fire extinguishing devices, zero leakage valves useful in aerospace fuel containers, propulsion systems for rockets and torpedos, jet engines, gas turbines and the like. Typical of such prior art devices are those disclosed in the following United States Patents:

U.S. Pat. No. 2,141,232 R. E. Wallace et al
U.S. Pat. No. 2,557,448 A. Mathisen
U.S. Pat. No. 2,801,517 M. J. Zucrow et al
U.S. Pat. No. 2,937,654 L. Bruce Wilner
U.S. Pat. No. 3,630,214 K. A. Levering
U.S. Pat. No. 3,719,194 D. M. Anderson et al
U.S. Pat. No. 3,794,057 E. H. Badger
U.S. Pat. No. 3,915,235 J. Hamilton, et al
U.S. Pat. No. 4,126,184 J. O. Hinrichs Each of the devices shown in the prior art patents above-referred to deal with a valving mechanism which interconnect fuel or other fluids to a using means and which contain frangible fittings of some type. In some instances the apparatus conducts fluid maintained under high pressure in a container through conduits to a using apparatus. However, none of the prior art patents disclose apparatus of the type disclosed and claimed herein.

SUMMARY OF THE INVENTION

First and second disposed tubes, one within the other, the walls of which define flow paths; the outer tube is constructed of bendable, soft, metallic material, while the inner tube is constructed of frangible metallic material. Opposite ends of the two flow paths are open and are connected, respectively, to a source of fluid under pressure and a using apparatus but the flow paths are normally blocked. Means is disposed intermediate the ends of the tubes for applying a mechanical force of sufficient strength to bend the outer tube and fracture the inner frangible tube to thereby interconnect the flow paths and the source of fluid under pressure to the using apparatus.

DETAILED DISCLOSURE

Figure 1:
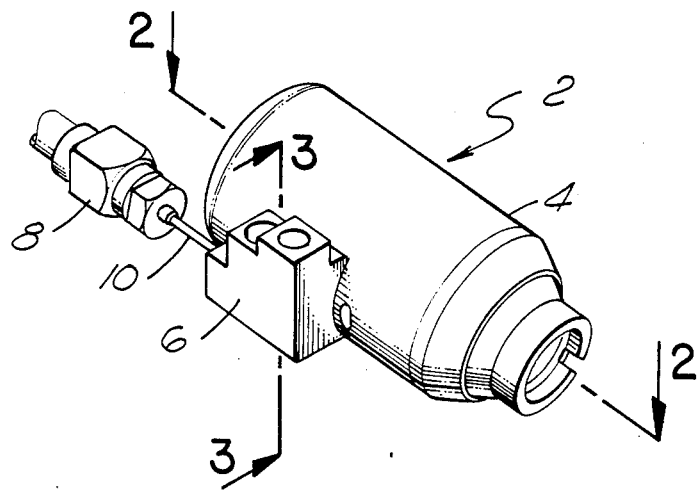
FIG. 1 is a perspective view illustrating generally apparatus constructed in accordance with the present invention.

Apparatus constructed in accordance with the present invention is shown generally at 2 in FIG. 1 and includes a package 4 within which is arranged a self-contained source of fluid under pressure and a cryostat. A body 6 is rigidly affixed to the package 4 and contains the appropriate valving and actuating apparatus. A fitting 8 is connected by a tube 10 to the body 6. The fitting 8 is connected to a source of fluid, under pressure, for filling the container within the package 4 as will be more fully explained hereinafter. Subsequent to filling, the tube 10 is pinched, sealed, severed and the fitting 8 removed. Thereafter appropriate actuating devices as more fully explained below are incorporated into the body 6 to render the unit operable. The structure as generally shown in FIG. 1 and as above generally discussed, is useful to contain a source of pressurized fluid, particularly gas such as argon which is maintained at a relatively high pressure, for example, approximately 6000 p.s.i. When the pressurized gas is released it is transmitted into the cryostat and expands in order to bring an infrared lens to the desired cryostat operating temperature. Apparatus of the type disclosed herein is particularly useful in single use applications such as heat seeking missiles.

Figure 2:
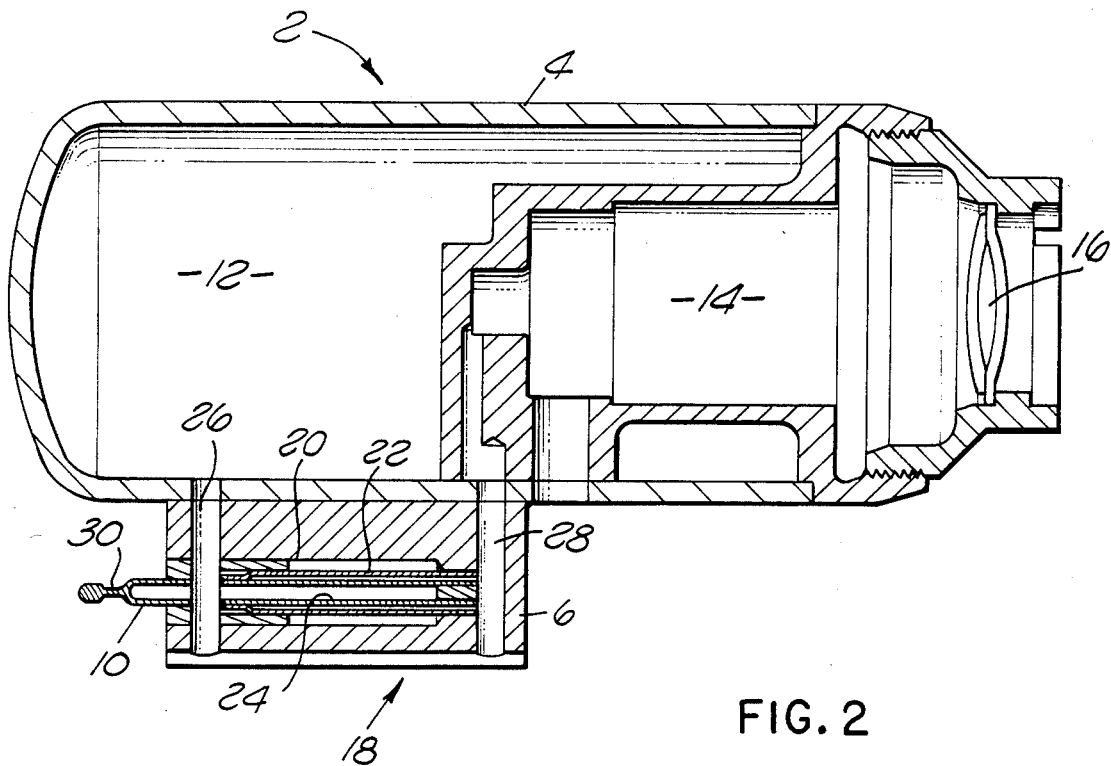
FIG. 2 is a cross sectional view of the apparatus shown in FIG. 1 taken about the lines 2—2 thereof, showing a completed device wherein a container of pressurized fluid is connected to a cryostat by way of a normally closed flow path constructed in accordance with the present invention.

As is more fully shown in FIG. 2, the package 4 includes a self-contained section 12 within which the pressurized fluid such as argon is contained. Also provided is a cryostat 14 within which is positioned the apparatus to be maintained at cryogenic temperatures such as, for examples, an IR lens 16. The "valve" 18 is positioned to connect the chamber 12 with the cryostat 14 as will be more fully described below.

Generally, the body 6 defines a bore 20 within which is disposed a pair of tubes 22 and 24 positioned to provide communication between passageways 26 and 28 connected, respectively, to the chamber 12 and the cryostat 14. The filling tube 10 communicates with the passageway 26 to supply the chamber 12 with pressurized fluid after which the tube 10 is pinched off and sealed as shown at 30, such for example as by welding or the like.

Figure 3:
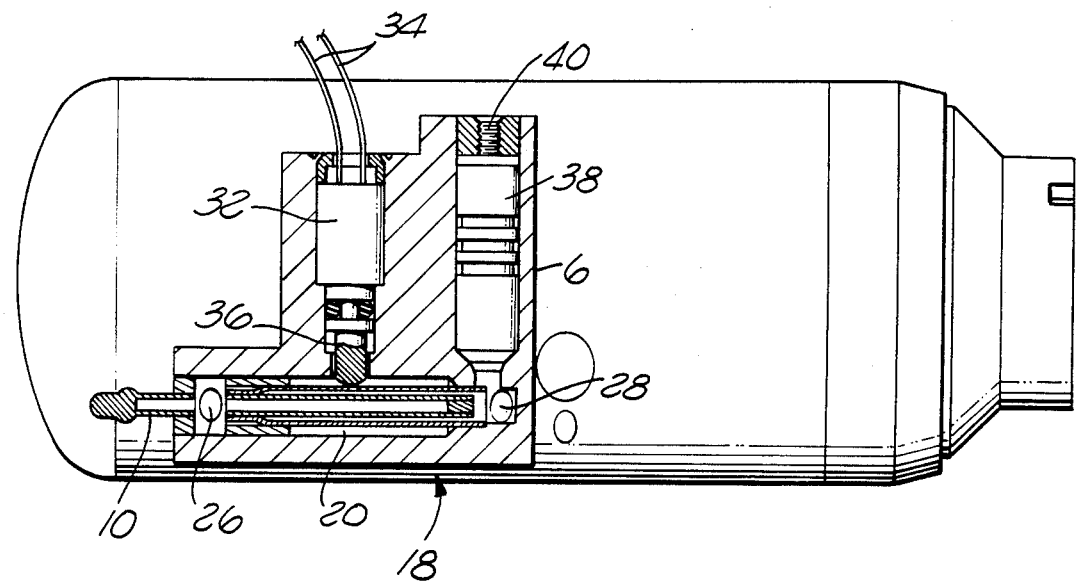
FIG. 3 is a cross sectional view taken about the lines 3—3 of FIG. 1 showing the apparatus of FIG. 2 with the actuating apparatus and testing apparatus in position.

As is more fully shown in FIG. 3, the body 6 contains therein not only the "valve" apparatus 18 interconnecting the passageways 26 and 28 but also there is positioned therein a squib 32 which, upon actuation by application of an electrical signal to the leads 34, propels a plunger 36 downwardly as viewed in FIG. 3, into engagement with the tubes forming the valve 18 as will be more fully disclosed below. Such squibs are well known to the art as are mechanical plungers actuated thereby and thus it is not believed further description is required.

Also provided within the body 6 is a check valve 38 which permits connection of an external source (not shown) of gas under pressure to a port 40 to permit flow of the gas from the source, through the port 40, through the check valve 38, into the passageway 28 and into the cryostat 14 for testing purposes without utilization of the gas contained in the chamber 12.

Figure 4:
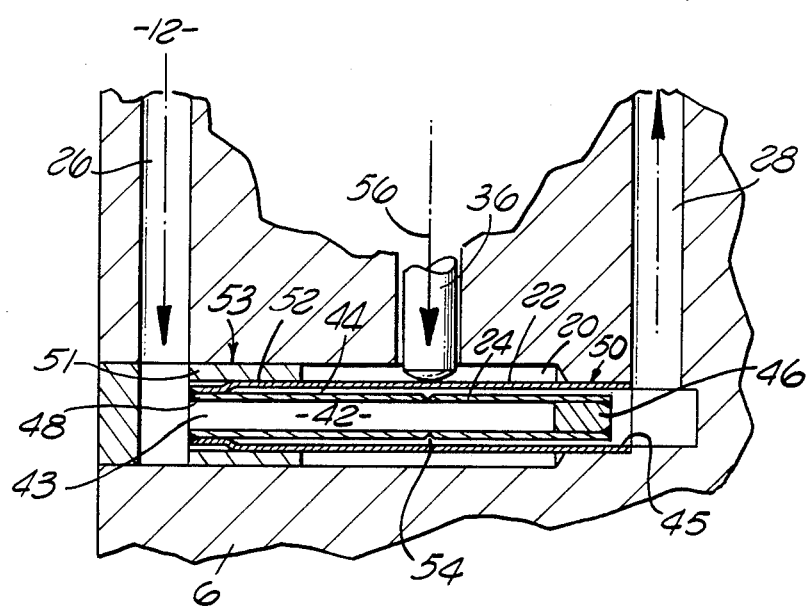
FIG. 4 is a fragmentary view showing the structure of the fracture tube valve of the present invention in greater detail.
Figure 5:
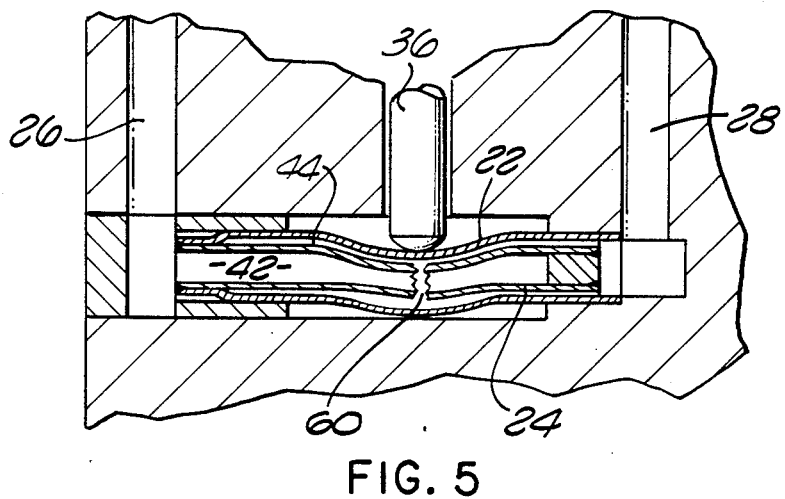
FIG. 5 is a cross sectional view illustrating the apparatus of the invention after actuation thereof.

Referring now more particularly to FIG. 4, the specific construction of a preferred embodiment of the "valve" constructed in accordance with the principles of the present invention is shown. As can be more easily seen in FIG. 4, positioned within the bore 20 are the outer tube 22 and the inner tube 24. The outer tube 22 between its inner wall and the outer wall of the inner tube 24 defines an annular flow passage 44 surrounding the inner tube 24. The inner tube 24 also defines a tubular flow passage 42. It should be noted that the end 43 of the tube 24 is connected to the passageway 26 which, it will be remembered, is directly in communication with the chamber 12 containing the source of pressurized gas. It will further be noted that the end 45 of the tube 22 is directly in communication with the passageway 28 which leads to the cryostat 14.

A plug 46 is sealed in position as by welding, spin sealing or swaging to seal the flow path 42 to maintain it normally in non-communication with the flow path 44. The tube 22 is upset and formed to engage the outer surface of the tube 24 and the two are welded, spun sealed or swaged together to form a seal at 48, thereby preventing communication through the flow path 44 with the passage 26. The outer surface of the tube 22 is welded or otherwise sealed to an insert 51 as is shown at 52. The outer surface of the tube 22 and the outer surface of the insert 51 are welded or otherwise sealed to the inner surface of the bore 20 as shown at 50 and 53.

The outer surface of the tube 24 is grooved so as to provide a reduced diameter score line completely about its circumference as is shown at 54.

It will now be recognized by those skilled in the art that the tubes 22 and 24 by being appropriately plugged at opposite ends thereof and by being sealed to the body 6 provide a totally sealed unit insofar as the chamber 12 containing the pressurized gas is concerned. That is, once the chamber has been charged with gas, such as argon at 6000 p.s.i. and the filling tube 10 pinched off and sealed as above described, the chamber 12 is totally isolated and maintains a seal so that none of the pressurized fluid contained therein can leak out. Therefore the unit remains ready to function as intended at all times until the flow paths 42 and 44 are placed in communication with each other.

Upon firing of the squib 32 the plunger 36 moves downwardly in response to the force as shown by the arrow 56 applied thereto. Such downwardly projected force bends the outer tube 22 which is made of soft and malleable material such that the force 56 is in turn applied to the tube 24 at the reduced diameter groove 54 thereof. The tube 24 is constructed of brittle metallic material and thus fractures at the reduced diameter grooved portion 54 thereof. Upon fracturing the two flow paths 42 and 44 are instantly placed in communication with each other and the gas, under pressure, in the chamber 12 is then permitted to flow through the flow path 42, the fracture 60, the flow path 44 and into the cryostat 14. Therefore it will be seen that the tubes 22 and 24, which are preferably coaxially disposed, being open at opposite ends and sealed at the other opposite ends, provide a normally closed flow path connected between the passageways 26 and 28. The structure effectively serves as a one-shot valve structure with the valve being actuated or opened upon firing of the squib. A critical feature of the structure is that the inner tube 24 be made of brittle, frangible, metallic material, while the outer tube is made of malleable, easily bendable, metallic material which will not fracture upon application of the mechanical force thereto but will bend sufficiently to enable application of the mechanical force to the inner tube with sufficient impact to allow the inner tube to fracture.

Figure 6:
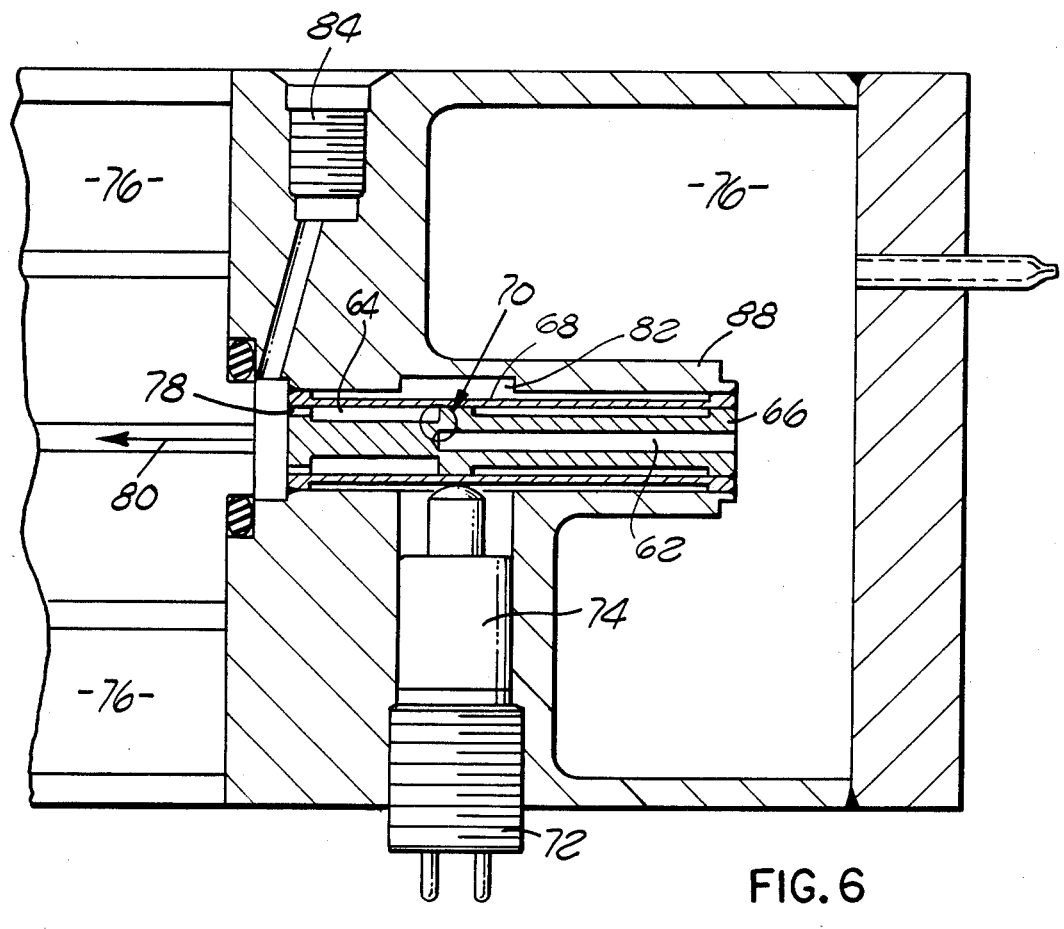
FIG. 6 is a cross sectional view illustrating an alternative embodiment of an apparatus constructed in accordance with the principles of the present invention.

Referring now more particularly to FIG. 6 there is disclosed an alternative embodiment of a structure constructed in accordance with the principles of the present invention. As is shown in FIG. 6 flow paths 62 and 64 are defined by preferably coaxially disposed tubes 66 and 68, respectively. The flow paths 62 and 64 are normally closed at their terminal ends defined by a shear section 70 and thus are normally in non-communication with each other. As was described above, the outer tube 68 is made of soft malleable material while the inner tube 66 is constructed of brittle frangible metallic material. Thus upon actuation of a squib 72 a plunger 74 moves into contact with the tubes at the shear section 70 thereof. Upon impact, the outer tube bends and the inner tube fractures at the shear section 70, thereby placing the flow paths 62 and 64 in communication with each other. When such is done, pressurized gas contained within the chamber 76 flows therefrom through the flow path 62, the fractured shear section 70, the flow path 64 through a plurality of openings 78 and out through a passage 80 to the using apparatus such as a cryostat.

As was discussed earlier, opposite ends of the tubes are open and opposite ends of the tubes are sealed with the entire tubular structure being sealed by welding, spin sealing or the like within a bore 82 provided within a body 88. Thus a completely sealed chamber 76 containing the pressurized gas is provided and which is maintained ready for use until the squib 72 is fired in accordance with a pre-programmed series of events. Also as previously described, a test port 84 having a check valve therein is provided so that the using apparatus may, from time to time, be tested by connecting an external source of gas under pressure to the testing port 84 for testing the using apparatus without disturbing the pressurized gas contained in the chamber 76.

What is claimed is:
1. A fluid delivery system comprising:
a chamber for receiving fluid under pressure;
a passageway for connecting said chamber to a using apparatus;
first tube means defining a first flow path coupled to said chamber;

second tube means defining a second flow path coupled to said passageway;

said tube means being disposed one within the other to define an inner and outer tube means, said outer tube means being of malleable metallic material and said inner tube means being of brittle frangible metallic material having a reduced wall thickness portion;

means for blocking opposite ends of each of said tube means for normally preventing communication between said flow paths; and means for applying force to said tube means sufficient to simultaneously bend said outer tube and to fracture said inner tube means only at said reduced wall thickness portion and to establish communication between said flow paths.

2. A fluid delivery system as defined in claim 1 wherein said first flow path is defined by said inner tube and said reduced wall thickness portion is defined by a continuous groove.

3. A fluid delivery system as defined in claim 2 wherein said first and second tube means are substantially co-extensive, said first flow path is tubular and said second flow path is annular.

4. A fluid delivery system as defined in claim 3 wherein said first tube is plugged at the end distally disposed from said chamber and said second tube is sealed at the end thereof nearest said chamber to said first tube.

5. A fluid delivery system as defined in claim 1 which further includes body means defining a base for receiving said first and second tubes, said bore having a diameter substantially larger than said outer tube for providing space to allow deformation of said tube means upon application of said force thereto.

6. fluid delivery system as defined in claim 5 wherein said force applying means includes a plunger and a squib.

7. A fluid delivery system as defined in claim 6 wherein said outer tube means remains imperforate after said squib is fired thereby isolating said flow paths from the products of combustion of said squib.

8. A fluid delivery system as defined in claim 1 wherein said first flow path is defined by said inner tube means and said reduced wall thickness is defined at a terminus of said first flow path.

9. A fluid delivery system as defined in claim 8 wherein said first and second flow paths are co-terminus and said reduced wall thickness defines a shear section at said co-terminus.

* * * * *